United States Patent [19]
Ueda

[11] Patent Number: 5,414,562
[45] Date of Patent: May 9, 1995

[54] ZOOM LENS
[75] Inventor: Kiichirou Ueda, Ashiya, Japan
[73] Assignee: Konica Corporation, Tokyo, Japan
[21] Appl. No.: 27,814
[22] Filed: Mar. 8, 1993
[30] Foreign Application Priority Data
Mar. 19, 1992 [JP] Japan .................... 4-092294
[51] Int. Cl.$^6$ .......................... G02B 15/14
[52] U.S. Cl. ...................... 359/683; 359/676; 359/684
[58] Field of Search .......... 359/683, 676, 684
[56] References Cited
U.S. PATENT DOCUMENTS
5,299,064  3/1994  Hamano et al. .......... 359/683 X FOREIGN PATENT DOCUMENTS
4-13109  1/1992  Japan.

OTHER PUBLICATIONS
English-language Abstract, Japanese Patent Publication Open to Public Inspection No. 4-13109 (Jan. 17, 1992).

Primary Examiner—Scott J. Sugarman
Attorney, Agent, or Firm—Finnegan, Henderson, Farabow, Garrett & Dunner

[57] ABSTRACT

A compact zoom lens with a high magnification ratio composed of, from an object side, a first lens group having a positive refractive power provided at a fixed position; a second lens group having negative refractive power including a meniscus single lens, the convex surface of which faces the object side, a biconcave single lens and a positive single lens, being movable along the optical axis in accordance with a change of magnification; a third lens group having a positive refractive power, including a lens having a weak refractive power with at least one aspherical surface, provided at a fixed position; a fourth lens group having a positive refractive power, being movable in accordance with a change of magnification; and a fifth lens group having a weak refractive power provided at a fixed position.

8 Claims, 10 Drawing Sheets

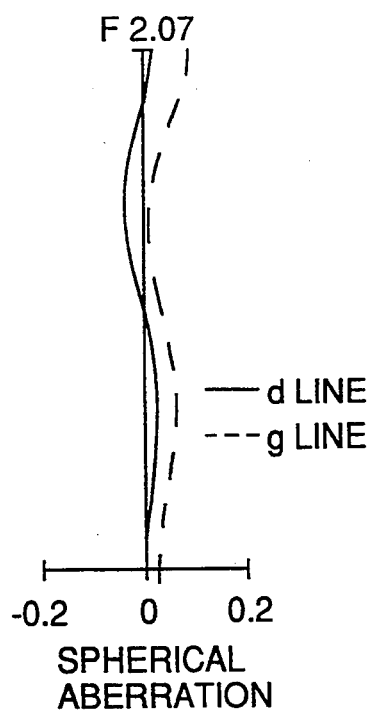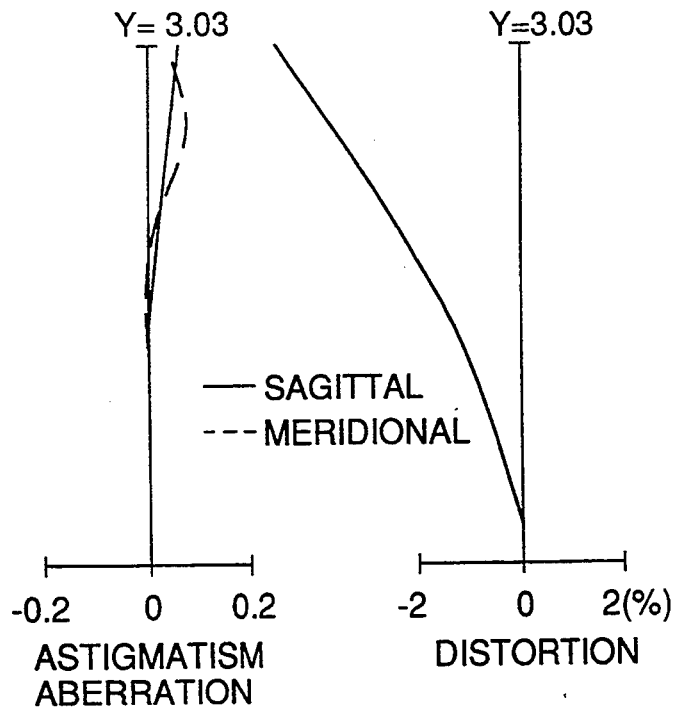
FIG. 3 (a)  FIG. 3 (b)  FIG. 3 (c)
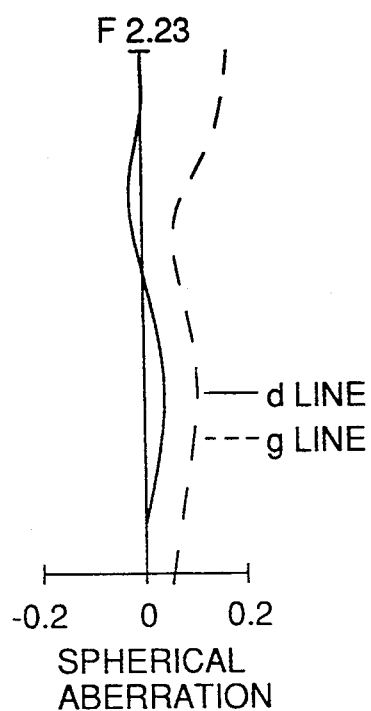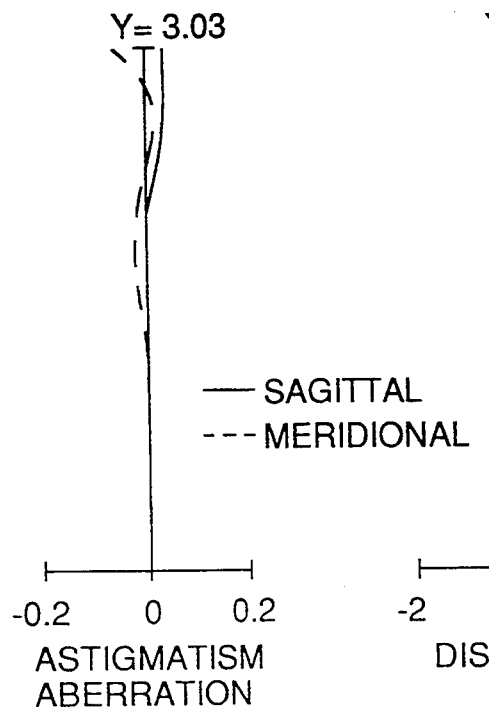
FIG. 3 (d)  FIG. 3 (e)  FIG. 3 (f)

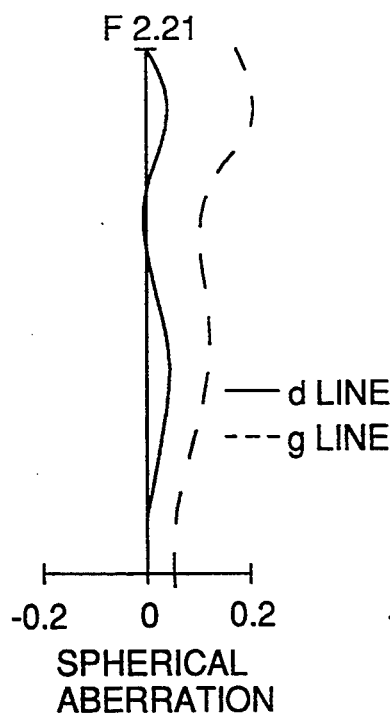
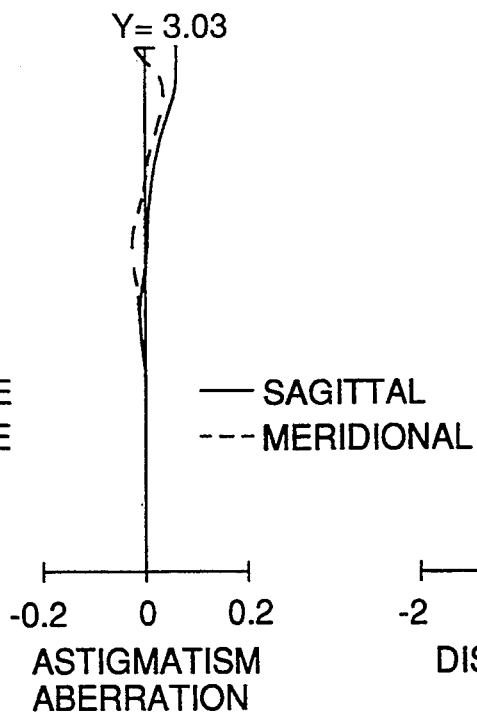
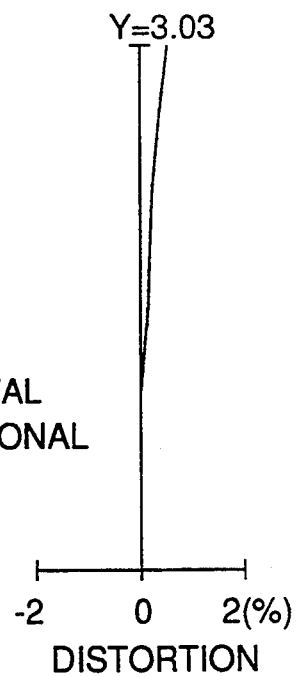
FIG. 4 (d)　　　FIG. 4 (e)　　　FIG. 4 (f)
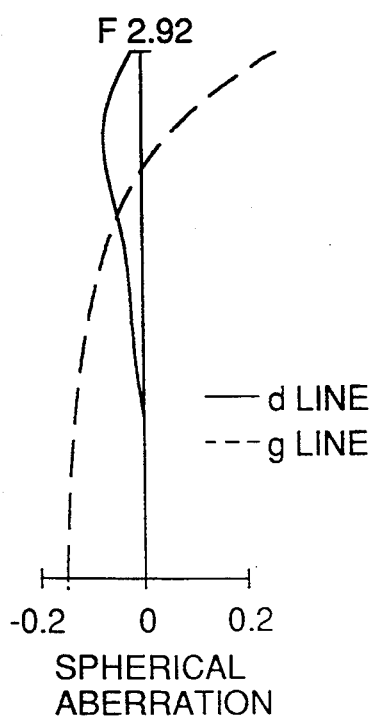
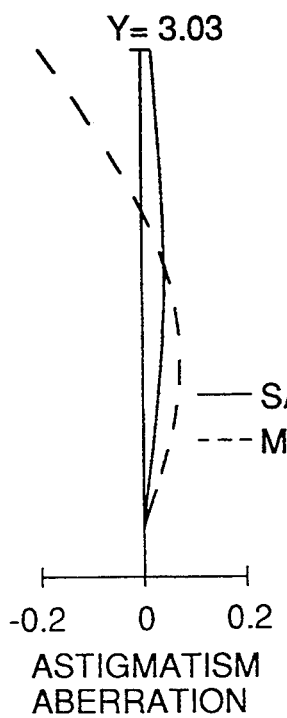
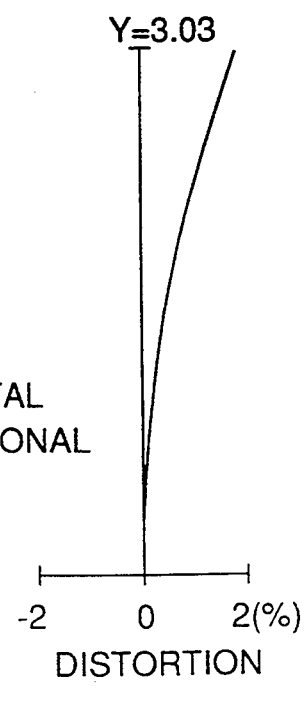
FIG. 4 (g)　　　FIG. 4 (h)　　　FIG. 4 (i)

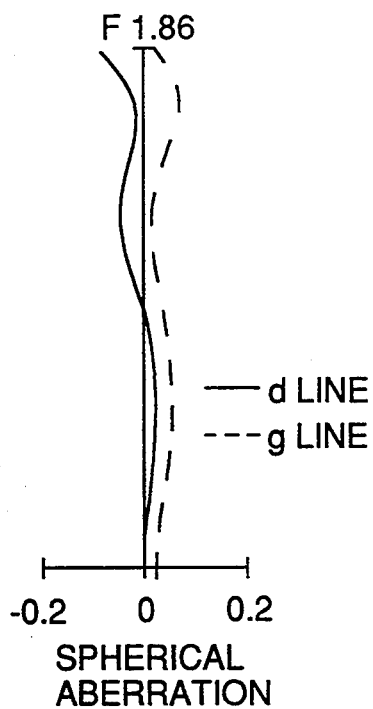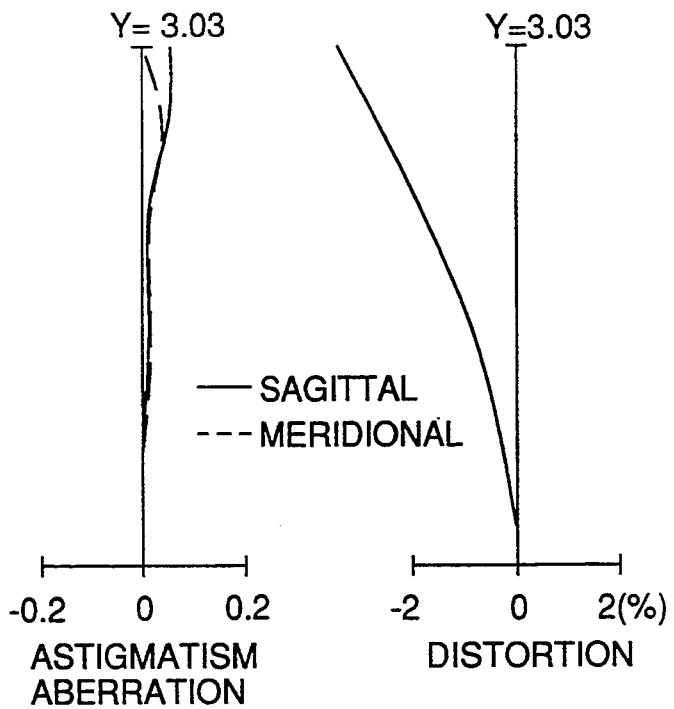
FIG. 5 (a)   FIG. 5 (b)   FIG. 5 (c)
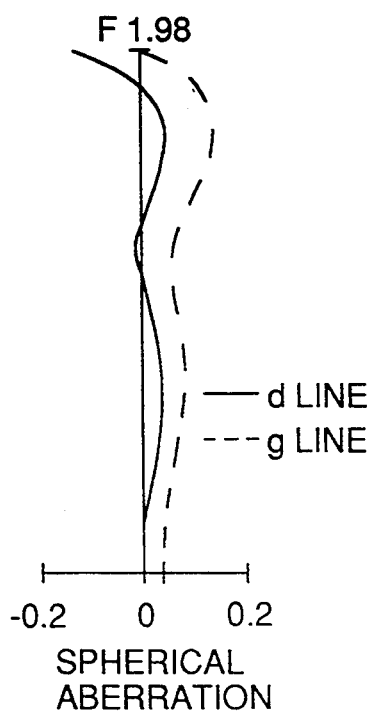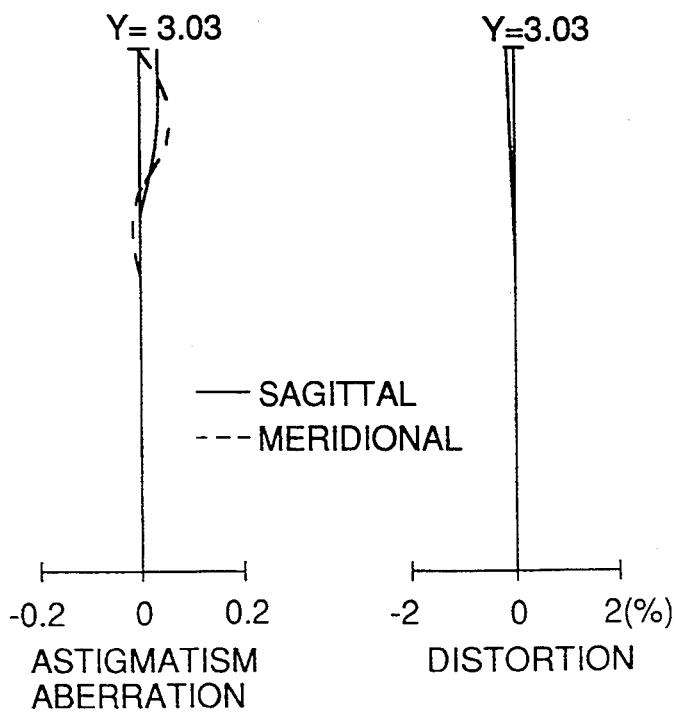
FIG. 5 (d)   FIG. 5 (e)   FIG. 5 (f)

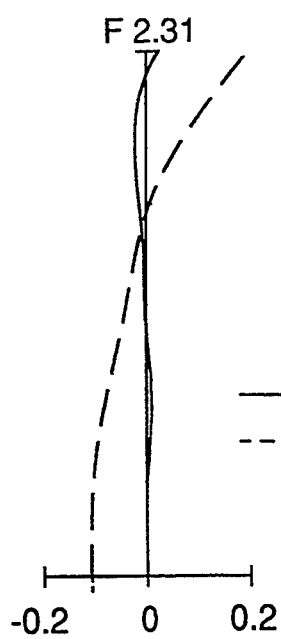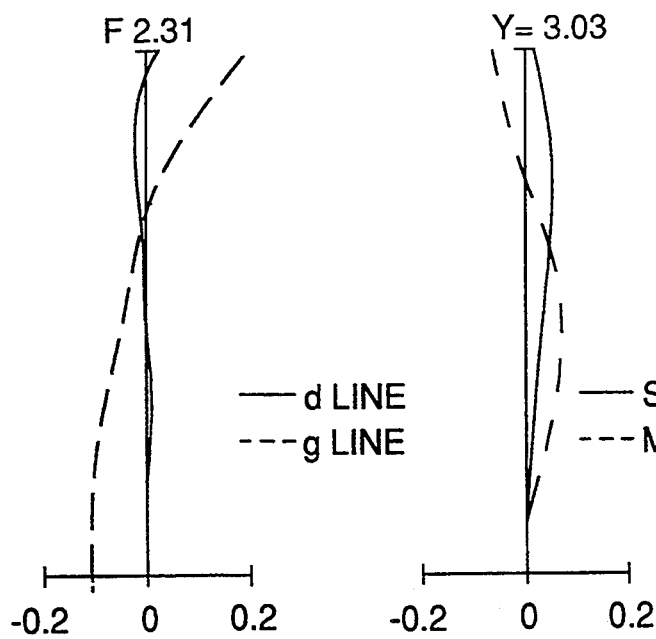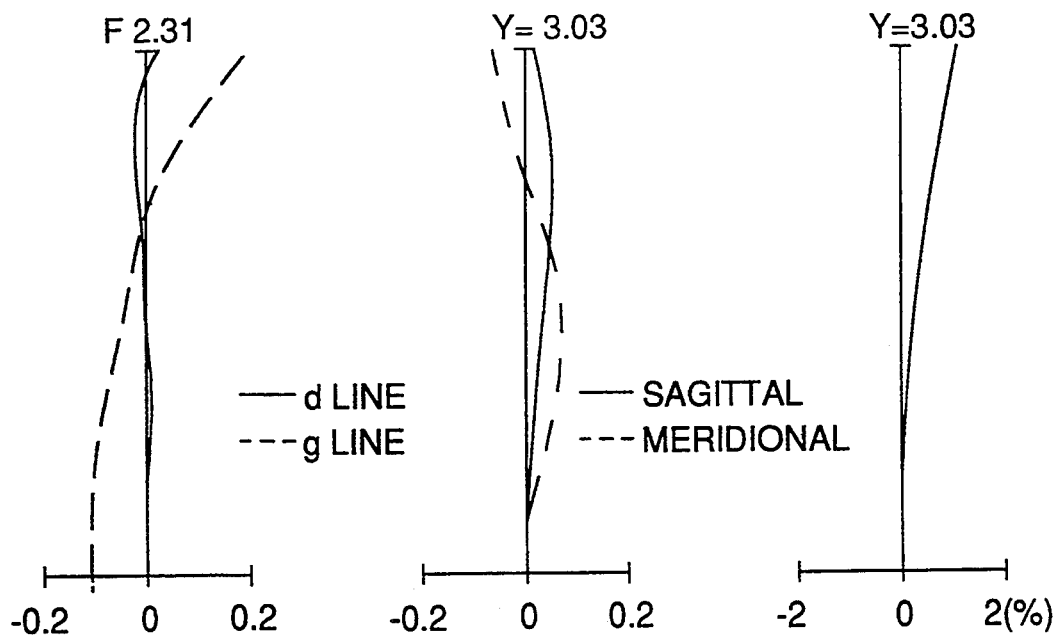
FIG. 5 (g)   FIG. 5 (h)   FIG. 5 (i)
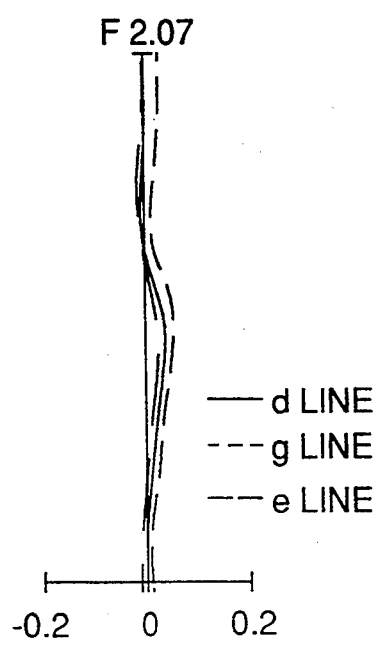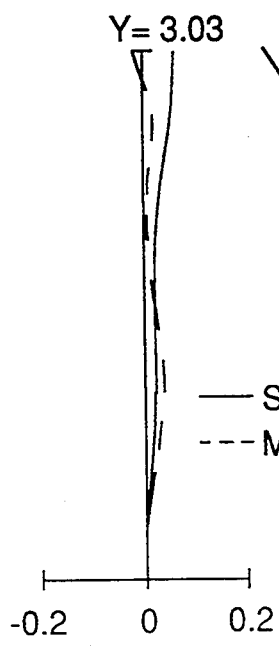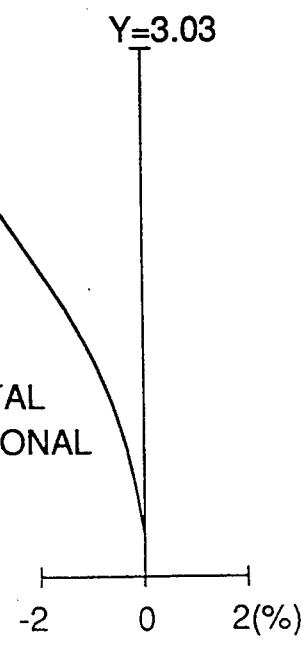
FIG. 6 (a)   FIG. 6 (b)   FIG. 6 (c)

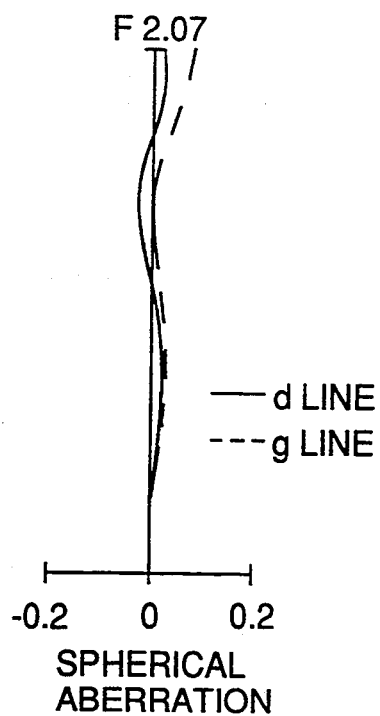
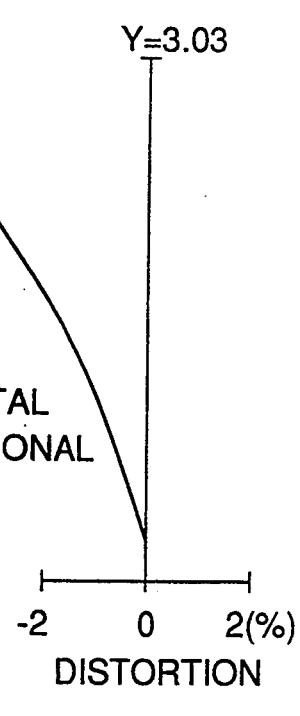
FIG. 7 (a)  FIG. 7 (b)  FIG. 7 (c)
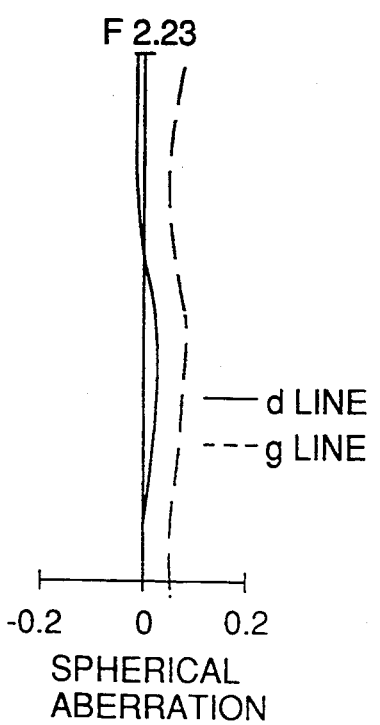
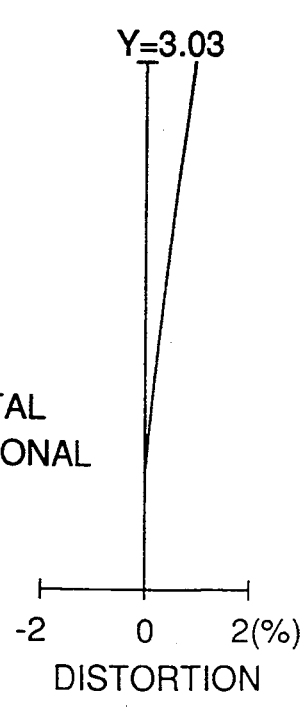
FIG. 7 (d)  FIG. 7 (e)  FIG. 7 (f)

ZOOM LENS

BACKGROUND OF THE INVENTION

The present invention relates to a small-sized zoom lens having a high magnification ratio and high efficiency, being thereby suitable for a video camera.

In recent years, development of zoom lenses for various video cameras has become active with popularization of a homestyle video camera of an integration type. Zoom lenses having a high magnification ratio such as 8 times or more are known, and as the small-sized ones among them, there are known zoom lenses such as those described in Japanese Patent Publication Open to Public Inspection No. 13109/1992 (hereinafter referred to as Japanese Patent O.P.I. Publication) wherein five lens groups having respectively refractive powers which are positive, negative, positive, positive and positive in that order from the object side are incorporated, and the second and fourth lens groups move in the course of zooming. In a zoom lens of this type, the number of moving lens groups including that for focusing is two, owing to the focusing function of the fourth lens group, which is a special feature advantageous for making a zoom lens small. In the case of a zoom lens of this type, however, it has been difficult to achieve a high magnification ratio and high efficiency.

Further, when a long focal length is taken at a telescopic end for achieving a high magnification ratio, the amount of movement of the fourth lens group for focusing at the telescopic end is increased, and aberration variation between the infinite object distance and the closest object distance is large. When a short focal length is taken at a wide angle end position to avoid the problem mentioned above, an increase of distortion is brought about, which is disadvantageous. Further, to satisfy the demand for high efficiency of a zoom lens, it has been considered to use many aspheric surfaces in the zoom lens. However, when an aspheric surface is used for a lens having a strong refractive power in a zoom lens, efficiency of the zoom lens is extremely deteriorated, which has been a problem.

Due to the problems mentioned above, zoom lenses known so far have not necessarily been satisfactory to obtain a small-sized zoom lens having a high magnification ratio and high efficiency.

SUMMARY OF THE INVENTION

An object of the invention is to provide a small-sized zoom lens offering high image quality which is composed of five lens groups and is free from the problems mentioned above despite its high magnification ratio, such as from 10 times to 12 times or more.

In an embodiment of the zoom lens of the invention, the zoom lens is composed of a positive first lens group that is stationary in the course of zooming, a negative lens group that moves during zooming, a positive third lens group that is stationary in zooming, a positive fourth lens group that moves during zooming and a stationary fifth lens group having a strong refractive power arranged in that order from the object side. The second lens group is composed of three lenses which include a negative meniscus single lens with its convex surface facing the object side, a biconcave single lens and a positive single lens which are arranged in that order from the object side, and the third lens group is composed of a lens having at least one aspherical surface and a weak refractive power and a positive lens having a weak refractive power. The foregoing represents characteristics of the embodiment of the zoom lens of the invention.

As shown in FIG. 1, the zoom lens of the invention is composed of a positive first lens group, a negative second lens group that moves during zooming for the zooming function, a stationary and positive third lens group for leading divergent rays from the second lens group to the fourth lens group, and a fourth lens group that moves during zooming for correcting changes in position of an image surface caused by the zooming. A stationary fifth lens group having weak refractive power is used for correcting effectively an image surface and distortion, having comparatively less influence on other aberrations by being next to the image surface.

Further, the second lens group is composed of three lenses which include a negative meniscus single lens with its convex surface facing the object side, a biconcave single lens and a positive single lens, arranged in that order from the object side. Owing to the lens arrangement mentioned above, a change in efficiency caused by the movement of the second lens group can be kept small even in the case of zooming with a high magnification ratio such as 10 times or more. Furthermore, the arrangement of the second lens group mentioned above is advantageous also for keeping small the occurrence of distortion at a wide angle end position, thus it is advantageous for developing a wider angle lens. In addition, at least one aspheric lens is employed in the third lens group so that spherical aberration may be corrected satisfactorily, and the aspheric lens is caused to have a relatively weak refractive power, thereby deterioration of efficiency caused by lens decentering can be kept small despite the usage of an aspheric lens, resulting in enhancement of productivity in mass production. Owing to the foregoing, excellent efficiency can be realized even on a zoom lens having a high magnification ratio which has so far been considered disadvantageous in a zoom lens of a type wherein two lens groups move.

BRIEF DESCRIPTION OF THE DRAWINGS

FIGS. 5(a)–(i) represent respectively aberration curves at a wide angle end position, a middle position and a telescopic end position in the third example of the zoom lens of the invention.

DETAILED DESCRIPTION OF THE PREFERRED EMBODIMENTS

Figure 1:
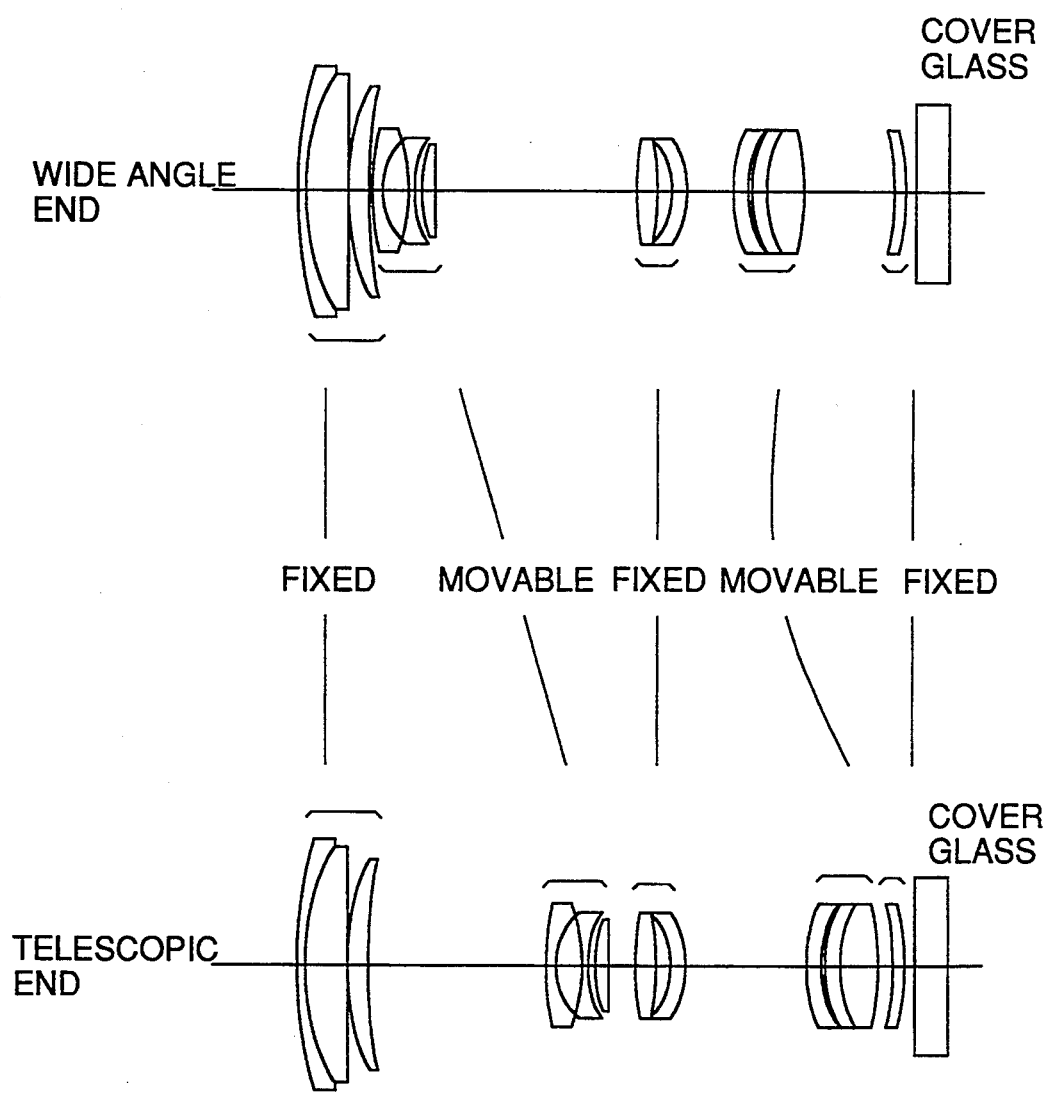
FIG. 1 is a diagram showing how each lens group moves basically and FIG. 2 represents sectional views of the first, second, third, fourth and fifth examples of a zoom lens of the invention.
Figure 2:
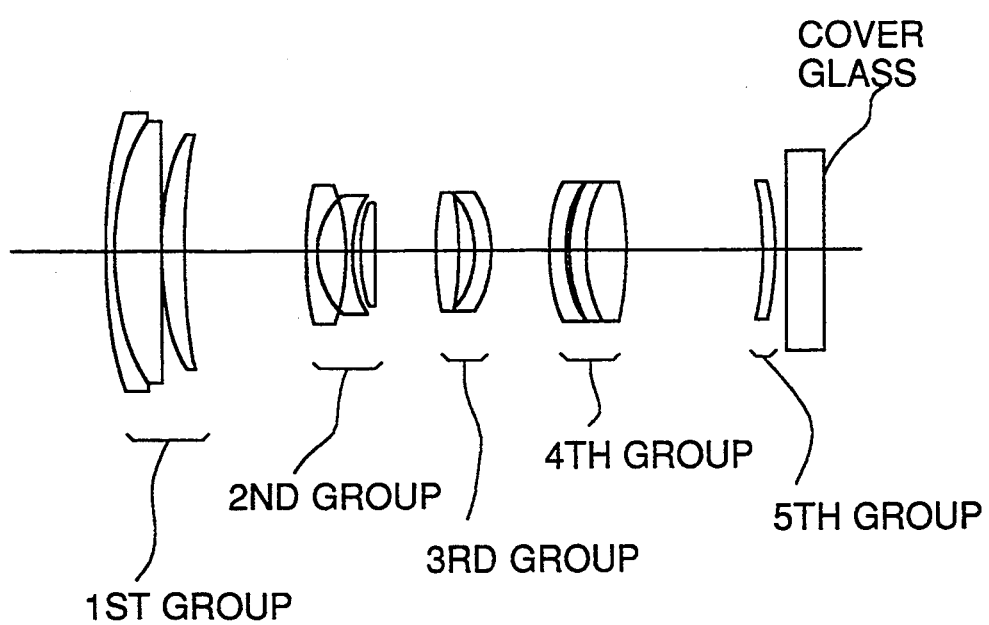
Figure 3:
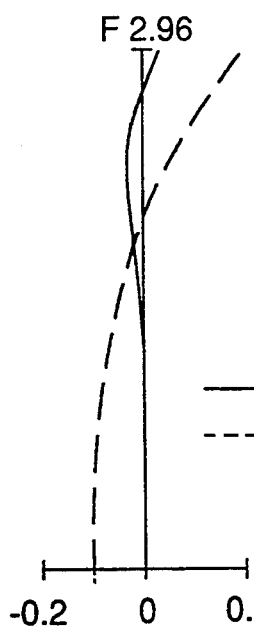
FIGS. 3(a)–(i) represent respectively aberration curves at a wide angle end position, a middle position and a telescopic end position in the first example of the zoom lens of the invention.
Figure 3:
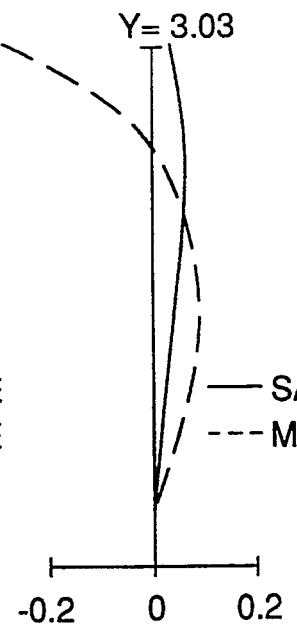
Figure 3:
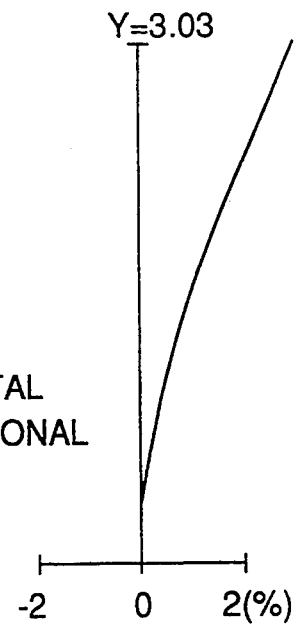
Figure 4:
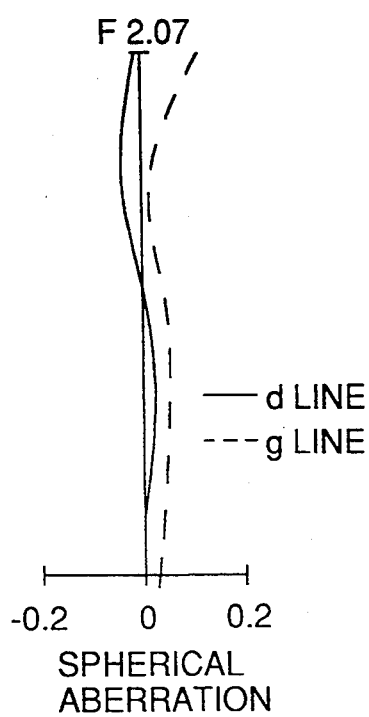
FIGS. 4(a)–(i) represent respectively aberration curves at a wide angle end position, a middle position and a telescopic end position in the second example of the zoom lens of the invention.
Figure 4:
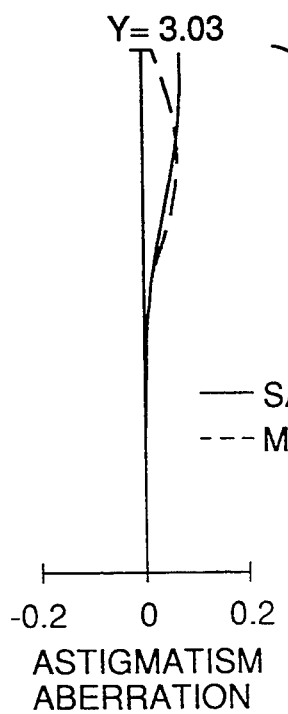
Figure 4:
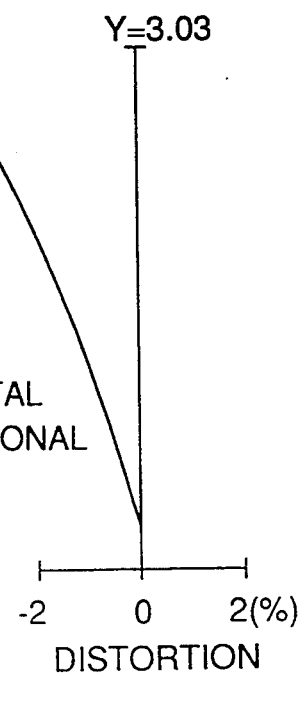
Figure 6:
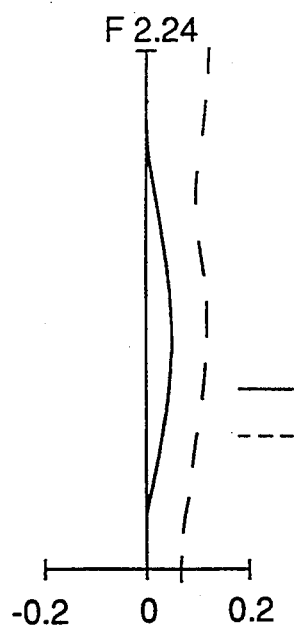
FIGS. 6(a)–(i) represent respectively aberration curves at a wide angle end position, a middle position and a telescopic end position in the fourth example of the zoom lens of the invention.
Figure 6:
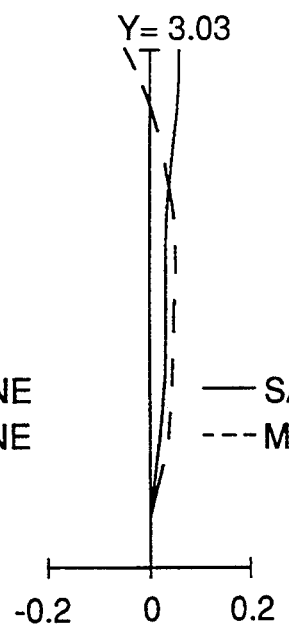
Figure 6:
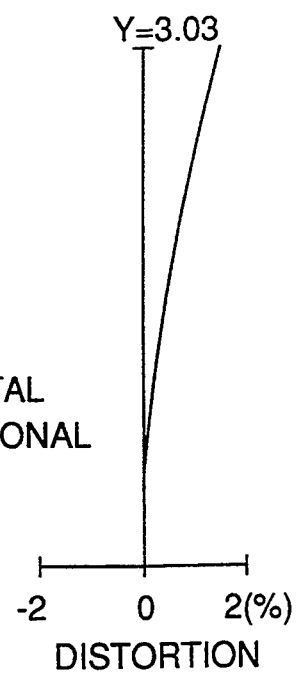
Figure 6:
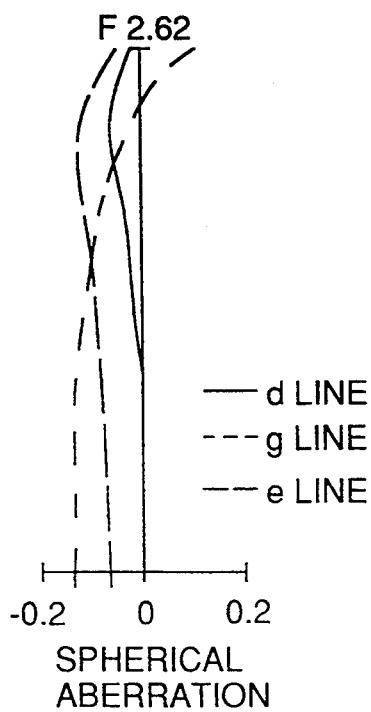
Figure 6:
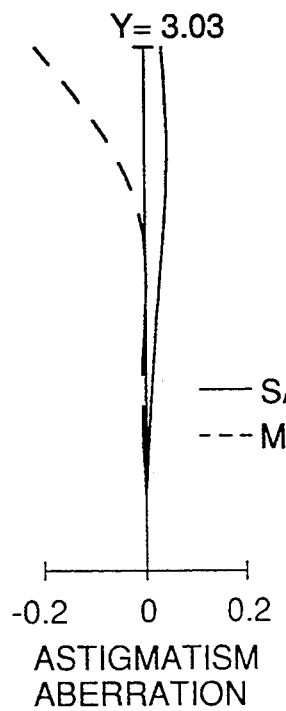
Figure 6:
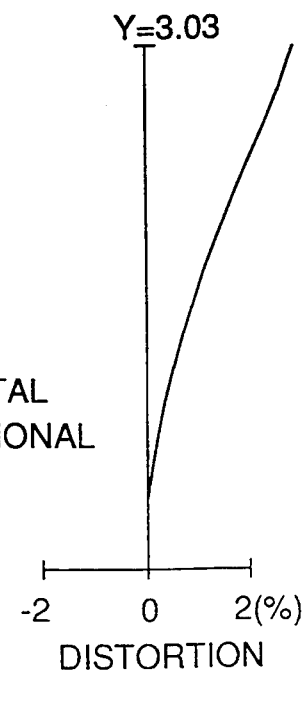
Figure 7:
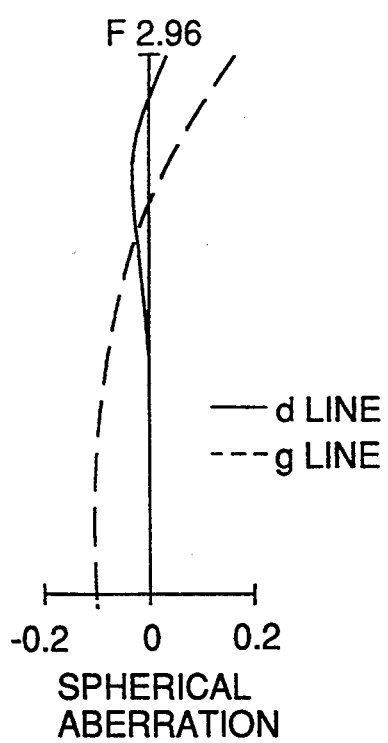
FIGS. 7(a)–(i) represent respectively aberration curves at a wide angle end position, a middle position and a telescopic end position in the fifth example of the zoom lens of the invention.
Figure 7:
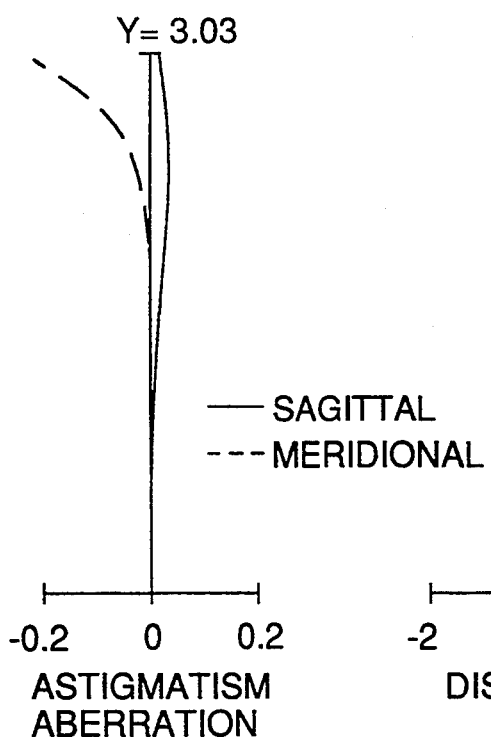
Figure 7:
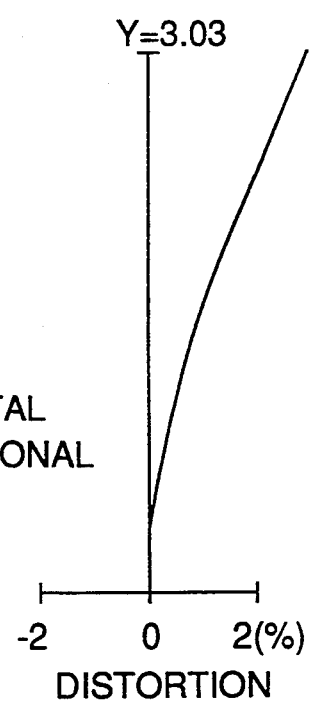

Examples of a zoom lens of the invention will be explained as follows. In the following examples, it is preferable that the conditions below are satisfied secondarily in addition to satisfying the basic constitution mentioned above.

Condition (1)

The fourth lens group includes two lenses, one is a positive lens and the other is a negative lens, satisfying the flowing inequalities;

$45.0 < V+$
$V- < 40.0$
$1.0 < f4/f+ < 3.0$
$-2.5 < f4/f- < -0.5$ wherein,
- $V+$: Abbe's number of a positive lens having the strongest refractive power among the fourth lens group
- $V-$: Abbe's number of a negative lens having the strongest refractive power among the fourth lens group
- f4: Focal length of the fourth lens group
- f+: Focal length of a positive lens having the strongest refractive power among the fourth lens group
- f-: Focal length of a negative lens having the strongest refractive power among the fourth lens group

Condition (2)

The fourth lens group is composed of three lenses, namely one positive lens, one negative lens and a lens having at least one aspheric surface and weak refractive power.

Condition (3)

To satisfy the following conditions in addition to satisfying Condition 2) above.

$fw/|f4a| < 0.25$ wherein,
- fw: Focal length of the total system at a wide angle end position
- f4a: Focal length of a lens having at least one aspheric surface and weak refractive power in the fourth lens group.

Condition (4)

$f3/|f3a| < 0.25$ wherein
- f3: Focal length of the third lens group
- f3a: Focal length of a lens having at least one aspheric surface and a weak refractive power in the third lens group.

Condition (5)

$0 < fT/f5 < 1.5$ wherein
- fT: Focal length of the total system at a telescopic end position
- f5: Focal length of the fifth lens group

Condition (6)

The fifth lens group includes at least one aspheric surface.

Condition (7)

$6 < Z \cdot fw/|f_2| < 13$ wherein,
- fw: Entire focal length at a wide angle end position
- $f_2$: Focal length of the second lens group
- Z: Magnification ratio The meaning of the condition to be satisfied secondarily is as follows.

Condition (1) relates to the constitution of the fourth lens group, and satisfying this condition is advantageous for keeping the change in chromatic aberration of magnification caused by moving the fourth lens group small.

However, when the fourth lens group is composed of not less than four lenses, the condition mentioned above does not necessarily need to be satisfied because it is easy to share the effect of correction.

Condition (2) relates to the constitution of the fourth lens group. Since the fourth lens group is a moving group, it is important for obtaining excellent lens efficiency that efficiency change caused by the movement is kept small. Therefore, coma aberration and others are corrected satisfactorily by using an aspheric surface and efficiency fluctuation caused by decentering of an aspheric lens is kept small by using a lens having comparatively weak refractive power.

Condition (3) is a condition relating to refractive power of a lens having comparatively weak refractive power in Condition 2), and satisfying this condition is advantageous for using the Condition 2) more effectively. Though the fourth lens group is required to be as light in weight as possible because the lens group is a moving group, satisfying Condition (3) is advantageous for keeping the efficiency fluctuation small when materials which are lighter than a glass lens but are more inferior from an environmental aspect, like plastic lenses, are used. When no plastic lens is used, Condition (3) does not necessarily need to be satisfied.

Condition (4) is a condition relating to a lens having a comparatively weak refractive power in the third lens group, and satisfying this condition is preferable for keeping the efficiency fluctuation caused by decentering of a main lens employing an aspheric surface small. In the case of a greater F number, however, this condition does not always need to be satisfied because decentering has less influence on spherical aberration.

Condition (5) relates to refractive power of the fifth lens group, and when the upper limit of this condition is exceeded, an amount of movement of the fourth lens group is increased, which is disadvantageous for making a zoom lens small, while, when the lower limit is exceeded, on the contrary, a negative Petzval's sum increases to adversely affect aberration correction. For the reasons mentioned above, it is preferable for making a zoom lens small and maintaining lens efficiency that Condition (5) is satisfied. However, when a small size of a zoom lens has priority, or when lens efficiency has priority, Condition (5) does not necessarily need to be satisfied.

Condition (6) relates to the fifth lens group, and it is effective for correcting satisfactorily a curved image surface and distortion to use an aspheric surface in the fifth lens group. However, when the fifth lens group is composed of two lenses or more, this condition is not always necessary.

Condition (7) relates to the second lens group. To realize a zoom lens having a high magnification ratio such as 10-12 times or more, it is necessary to keep aberration fluctuations in zooming small. Weakening refractive power of the second lens group is also effective for keeping the aberration fluctuations small. However, this causes an increase in movement of the lens group in the course of zooming, which is disadvantageous for making a zoom lens small. Therefore, it is effective for realizing a small-sized lens to solve the aforementioed problems while keeping the aberration fluctuations small, so that Condition (7) is satisfied. When the F number is large, however, it is not always necessary to satisfy this condition, because efficiency fluctuation is small.

Various data in the examples are shown below as tables. Further, values corresponding to each condition for each example described in the present specification are shown as separate tables. Incidentally, in the examples, a lowpass filter, an infrared blocking filter and a cover glass equivalent to a face plate are provided between the surface of the lens nearest the image surface and the image surface.

Symbols in the table represent as follows.
- R: Radius of curvature on each reflecting surface
- D: Distance between reflecting surfaces
- N: Refraction index of lens material (d line in wavelength=587.56 nm)
- V: Abbe's No. of lens material
- F: Focal length of total lens system
- $2\omega$: Angle of view
- FNo.: F-number
- Y: Image height
- Z: Magnification ratio Aspherical shapes in Examples are represented by the following expression.

$$\phi = \frac{Ch^2}{1 + \sqrt{1 - (K+1)C^2h^2}} + A_1 h^{P1} + A_2 h^{P2} + A_3 h^{P3} + A_4 h^{P4} \quad \text{[Expression 1]}$$

Each symbol in the expression represents as follows.
- C=1/R: Paraxial curvature of aspherical surface
- h: Distance from optical axis
- K: Circular cone constant
- $\phi$: Amount of deformation (including an amount of displacement of aspherical surface) measured in the direction from surface summit to an optical axis

EXAMPLE 1

TABLE 1

| F = 6.00–63.00 | | FNo. = 2.07–2.96 | | | |
| $2\omega$ = 53.6°–5.5° | | Y = 3.03 | | Z = 10.5 | |
| Surface No. | | R | D | N | v |
| 1 | ⎤ | 30.938 | 0.80 | 1.84666 | 23.8 |
| 2 | | 18.376 | 4.65 | 1.69680 | 55.5 |
| 3 | First lens | 185.307 | 0.15 | | |
| 4 | group | 22.413 | 2.50 | 1.69680 | 55.5 |
| 5 | ⎦ | 56.876 | A | | |
| 6 | ⎤ | 33.464 | 0.60 | 1.77250 | 49.6 |
| 7 | | 6.886 | 2.70 | | |
| 8 | Second lens | −12.231 | 0.55 | 1.77250 | 49.6 |
| 9 | group | 12.231 | 1.00 | | |
| 10 | | 14.914 | 1.55 | 1.84666 | 23.8 |
| 11 | ⎦ | −188.555 | B | | |

TABLE 1-continued

| 12 | ⎤ | 19.768 | 1.95 | 1.58913 | 61.2 |
| 13 | Third lens | −40.712 | 0.70 | | |
| 14 | group | −14.261 | 1.40 | 1.58300 | 30.0 |
| 15 | ⎦ | −15.951 | C | | |
| 16 | ⎤ | 19.757 | 1.40 | 1.49200 | 57.0 |
| 17 | Fourth lens | 19.099 | 0.20 | | |
| 18 | group | 21.304 | 0.70 | 1.84666 | 23.8 |
| 19 | | 8.584 | 4.05 | 1.69680 | 55.5 |
| 20 | ⎦ | −23.894 | D | | |
| 21 | ⎤ Fifth lens | −20.000 | 1.40 | 1.49200 | 57.0 |
| 22 | ⎦ group | −16.088 | 1.20 | | |
| 23 | ⎤ Cover glass | ∞ | 4.90 | 1.51633 | 64.1 |
| 24 | ⎦ | ∞ | | | |

| Group distance | | | | |
| --- | --- | --- | --- | --- |
| F | A | B | C | D |
| 6.00 | 0.60 | 19.25 | 5.04 | 7.71 |
| 18.75 | 10.50 | 9.35 | 2.36 | 10.38 |
| 63.00 | 17.10 | 2.75 | 10.93 | 1.82 |

| Focal length of each lens group | |
| --- | --- |
| First lens group | F(1-5) = 29.263 |
| Second lens group | F(6-11) = −6.551 |
| Third lens group | F(12-15) = 25.301 |
| Fourth lens group | F(16-20) = 20.702 |
| Fifth lens group | F(21-22) = 149.514 |

| Aspherical coefficient | Exponent |
| --- | --- |
| K = 0.18941 × 10 | |
| A1 = 0.12368 × 10⁻³ | P1 = 4.0 |
| A2 = −0.45856 × 10⁻⁵ | P2 = 6.0 |
| A3 = 0.32546 × 10⁻⁶ | P3 = 8.0 |
| A4 = −0.61608 × 10⁻⁸ | P4 = 10.0 |
| K = −0.17842 | |
| A1 = −0.51118 × 10⁻⁴ | P1 = 4.0 |
| A2 = 0.15623 × 10⁻⁶ | P2 = 6.0 |
| A3 = 0.17595 × 10⁻⁷ | P3 = 8.0 |
| A4 = −0.20593 × 10⁻⁹ | P4 = 10.0 |
| K = −0.39583 × 10 | |
| A1 = 0.52448 × 10⁻⁴ | P1 = 4.0 |
| A2 = −0.20229 × 10⁻⁵ | P2 = 6.0 |
| A3 = 0.14852 × 10⁻⁷ | P3 = 8.0 |
| A4 = −0.61110 × 10⁻⁹ | P4 = 10.0 |

EXAMPLE 2

TABLE 2

| F = 5.86–61.84 | | FNo. = 2.07–2.92 | | | |
| $2\omega$ = 54.7°–5.6° | | Y = 3.03 | | Z = 10.55 | |
| Surface No. | | R | D | N | v |
| 1 | ⎤ | 26.617 | 1.00 | 1.84666 | 23.8 |
| 2 | | 16.420 | 5.10 | 1.69680 | 55.5 |
| 3 | First lens | 167.152 | 0.15 | | |
| 4 | group | 20.563 | 2.40 | 1.69680 | 55.5 |
| 5 | ⎦ | 43.804 | A | | |
| 6 | ⎤ | 35.198 | 0.60 | 1.77250 | 49.6 |
| 7 | | 6.122 | 2.70 | | |
| 8 | Second lens | −11.795 | 0.60 | 1.77250 | 49.6 |
| 9 | group | 11.795 | 1.00 | | |
| 10 | | 14.480 | 1.60 | 1.84666 | 23.8 |
| 11 | ⎦ | −139.973 | B | | |
| 12 | ⎤ | 17.915 | 1.90 | 1.58913 | 61.2 |
| 13 | Third lens | −43.841 | 0.90 | | |
| 14 | group | −14.261 | 1.40 | 1.58300 | 30.0 |
| 15 | ⎦ | −15.673 | C | | |
| 16 | ⎤ | 17.953 | 0.70 | 1.84666 | 23.8 |
| 17 | Fourth lens | 8.078 | 4.60 | 1.62299 | 58.2 |
| 18 | group | −19.084 | D | | |
| 19 | ⎤ Fifth lens | −20.000 | 1.40 | 1.49200 | 57.0 |
| 20 | ⎦ group | −17.714 | 1.32 | | |
| 21 | ⎤ Cover glass | ∞ | 4.90 | 1.51633 | 64.1 |
| 22 | ⎦ | ∞ | | | |

| Group distance | | | | |
| --- | --- | --- | --- | --- |
| F | A | B | C | D |

TABLE 2-continued

| | | | | |
|---|---|---|---|---|
| 5.86 | 0.50 | 17.60 | 4.46 | 7.48 |
| 18.31 | 9.50 | 8.60 | 1.78 | 10.16 |
| 61.84 | 15.50 | 2.60 | 9.94 | 2.00 |

Focal length of each lens group

| | |
|---|---|
| First lens group | F(1–5) = 27.371 |
| Second lens group | F(6–11) = −5.908 |
| Third lens group | F(12–15) = 23.731 |
| Fourth lens group | F(16–18) = 19.928 |
| Fifth lens group | F(19–20) = 262.019 |

| Aspherical coefficient | Exponent |
|---|---|
| K = 0.22772 × 10 | |
| A1 = 0.18863 × $10^{-3}$ | P1 = 4.0 |
| A2 = −0.60059 × $10^{-5}$ | P2 = 6.0 |
| A3 = 0.39695 × $10^{-6}$ | P3 = 8.0 |
| A4 = −0.74531 × $10^{-8}$ | P4 = 10.0 |
| K = −0.67699 | |
| A1 = 0.24497 × $10^{-4}$ | P1 = 4.0 |
| A2 = −0.18724 × $10^{-6}$ | P2 = 6.0 |
| A3 = −0.39747 × $10^{-8}$ | P3 = 8.0 |
| A4 = −0.24862 × $10^{-9}$ | P4 = 10.0 |
| K = −0.38993 × 10 | |
| A1 = −0.13676 × $10^{-5}$ | P1 = 4.0 |
| A2 = −0.23742 × $10^{-5}$ | P2 = 6.0 |
| A3 = 0.97103 × $10^{-7}$ | P3 = 8.0 |
| A4 = −0.17929 × $10^{-9}$ | P4 = 10.0 |

EXAMPLE 3

TABLE 3

F = 5.45–56.98  FNo. = 1.86–2.31
2ω = 58.1°–6.1°  Y = 3.03  Z = 10.46

| Surface No. | | R | D | N | ν |
|---|---|---|---|---|---|
| 1 | ⎤ | 31.726 | 0.80 | 1.84666 | 23.8 |
| 2 | | 19.449 | 6.30 | 1.69680 | 55.5 |
| 3 | First lens | 150.623 | 0.15 | | |
| 4 | group | 22.062 | 3.00 | 1.69680 | 55.5 |
| 5 | ⎦ | 48.434 | A | | |
| 6 | ⎤ | 26.888 | 0.60 | 1.77250 | 49.6 |
| 7 | | 6.230 | 3.35 | | |
| 8 | Second lens | −12.607 | 0.60 | 1.77250 | 49.6 |
| 9 | group | 12.607 | 1.00 | | |
| 10 | | 15.126 | 1.80 | 1.84666 | 23.8 |
| 11 | ⎦ | −104.232 | B | | |
| 12 | ⎤ | 19.418 | 1.90 | 1.58913 | 61.2 |
| 13 | Third lens | −38.954 | 0.90 | | |
| 14 | group | −14.261 | 1.40 | 1.58300 | 30.0 |
| 15 | ⎦ | −17.088 | C | | |
| 16 | ⎤ | 15.692 | 0.70 | 1.84666 | 23.8 |
| 17 | Fourth lens | 7.705 | 4.80 | 1.62299 | 58.2 |
| 18 | group ⎦ | −19.599 | D | | |
| 19 | ⎤ Fifth lens | −20.000 | 1.40 | 1.49200 | 57.0 |
| 20 | ⎦ group | −18.082 | 1.88 | | |
| 21 | ⎤ Cover glass | ∞ | 4.90 | 1.51633 | 64.1 |
| 22 | ⎦ | ∞ | | | |

Group distance

| F | A | B | C | D |
|---|---|---|---|---|
| 5.45 | 0.50 | 19.90 | 4.99 | 5.73 |
| 16.91 | 10.88 | 9.52 | 2.64 | 8.08 |
| 56.98 | 17.80 | 2.60 | 8.18 | 2.55 |

Focal length of each lens group

| | |
|---|---|
| First lens group | F(1–5) = 31.565 |
| Second lens group | F(6–11) = −6.564 |
| Third lens group | F(12–15) = 26.004 |
| Fourth lens group | F(16–18) = 18.431 |
| Fifth lens group | F(19–20) = 308.897 |

| Aspherical coefficient | Exponent |
|---|---|
| K = 0.33736 × 10 | |
| A1 = 0.17476 × $10^{-3}$ | P1 = 4.0 |
| A2 = −0.59792 × $10^{-5}$ | P2 = 6.0 |
| A3 = 0.39703 × $10^{-6}$ | P3 = 8.0 |
| A4 = −0.74528 × $10^{-8}$ | P4 = 10.0 |
| K = −0.16753 × 10 | |
| A1 = 0.29425 × $10^{-4}$ | P1 = 4.0 |
| A2 = −0.28964 × $10^{-6}$ | P2 = 6.0 |
| A3 = −0.45149 × $10^{-8}$ | P3 = 8.0 |
| A4 = −0.25024 × $10^{-9}$ | P4 = 10.0 |
| K = −0.19349 × 10 | |
| A1 = −0.71472 × $10^{-5}$ | P1 = 4.0 |
| A2 = −0.23537 × $10^{-5}$ | P2 = 6.0 |
| A3 = 0.97145 × $10^{-7}$ | P3 = 8.0 |
| A4 = −0.17924 × $10^{-9}$ | P4 = 10.0 |

EXAMPLE 4

TABLE 4

F = 5.46–62.65  FNo. 2.07–2.62
2ω = 58.0°–5.5°  Y = 3.03  Z = 11.47

| Surface No. | | R | D | N | ν |
|---|---|---|---|---|---|
| 1 | ⎤ | 33.249 | 0.80 | 1.84666 | 23.8 |
| 2 | First lens | 19.871 | 6.00 | 1.69680 | 55.5 |
| 3 | group | 194.076 | 0.15 | | |
| 4 | | 23.505 | 3.00 | 1.69680 | 55.5 |
| 5 | ⎦ | 58.099 | A | | |
| 6 | ⎤ | 57.012 | 0.60 | 1.77250 | 49.6 |
| 7 | | 6.554 | 2.50 | | |
| 8 | Second lens | −13.847 | 0.60 | 1.77250 | 49.6 |
| 9 | group | 13.847 | 1.10 | | |
| 10 | | 15.540 | 1.55 | 1.84666 | 23.8 |
| 11 | ⎦ | −221.311 | B | | |
| 12 | ⎤ | 16.123 | 1.85 | 1.58913 | 61.2 |
| 13 | Third lens | −194.719 | 1.05 | | |
| 14 | group | −13.986 | 1.40 | 1.49200 | 57.0 |
| 15 | ⎦ | −12.791 | C | | |
| 16 | ⎤ | 14.894 | 1.40 | 1.49200 | 57.0 |
| 17 | Fourth lens | 17.435 | 0.30 | | |
| 18 | group | 27.000 | 0.70 | 1.84666 | 23.8 |
| 19 | | 8.864 | 4.05 | 1.69680 | 55.5 |
| 20 | ⎦ | −25.843 | D | | |
| 21 | ⎤ Fifth lens | −19.998 | 1.40 | 1.49200 | 57.0 |
| 22 | ⎦ group | −14.050 | 1.50 | | |
| 23 | ⎤ Cover glass | ∞ | 4.90 | 1.51633 | 64.1 |
| 24 | ⎦ | ∞ | | | |

Group distance

| F | A | B | C | D |
|---|---|---|---|---|
| 5.46 | 0.60 | 21.10 | 5.34 | 6.49 |
| 17.42 | 11.34 | 10.36 | 2.17 | 9.66 |
| 62.65 | 18.50 | 3.20 | 9.86 | 1.97 |

Focal length of each lens group

| | |
|---|---|
| First lens group | F(1–5) = 31.378 |
| Second lens group | F(6–11) = −6.489 |
| Third lens group | F(12–15) = 23.703 |
| Fourth lens group | F(16–20) = 22.557 |
| Fifth lens group | F(21–22) = 89.091 |

| Aspherical coefficient | Exponent |
|---|---|
| K = −0.10467 × 10 | |
| A1 = 0.68591 × $10^{-4}$ | P1 = 4.0 |
| A2 = −0.51307 × $10^{-5}$ | P2 = 6.0 |
| A3 = 0.2890g × $10^{-6}$ | P3 = 8.0 |
| A4 = −0.57153 × $10^{-8}$ | P4 = 10.0 |
| K = 0.12191 | |
| A1 = −0.58456 × $10^{-4}$ | P1 = 4.0 |
| A2 = 0.45601 × $10^{-6}$ | P2 = 6.0 |
| A3 = −0.24028 × $10^{-7}$ | P3 = 8.0 |
| A4 = 0.20014 × $10^{-9}$ | P4 = 10.0 |
| K = −0.28942 × 10 | |
| A1 = 0.54807 × $10^{-4}$ | P1 = 4.0 |
| A2 = 0.58114 × $10^{-6}$ | P2 = 6.0 |
| A3 = −0.68659 × $10^{-7}$ | P3 = 8.0 |
| A4 = −0.98295 × $10^{-9}$ | P4 = 10.0 |

EXAMPLE 5

TABLE 5

F = 6.00–57.16  FNo. = 2.07–2.96
2ω = 53.6°–6.1°  Y = 3.03  Z = 9.53

TABLE 5-continued

| Surface No. | | R | D | N | ν |
|---|---|---|---|---|---|
| 1 | First lens group | 30.961 | 0.80 | 1.84666 | 23.8 |
| 2 | | 18.630 | 4.55 | 1.69680 | 55.5 |
| 3 | | 177.308 | 0.15 | | |
| 4 | | 23.129 | 2.55 | 1.69680 | 55.5 |
| 5 | | 58.099 | A | | |
| 6 | Second lens group | 40.907 | 0.60 | 1.77250 | 49.6 |
| 7 | | 7.096 | 2.50 | | |
| 8 | | −12.922 | 0.60 | 1.77250 | 49.6 |
| 9 | | 12.922 | 1.10 | | |
| 10 | | 15.628 | 1.55 | 1.84666 | 23.8 |
| 11 | | −202.676 | B | | |
| 12 | Third lens group | 16.132 | 1.85 | 1.58913 | 61.2 |
| 13 | | −194.719 | 1.05 | | |
| 14 | | −13.986 | 1.40 | 1.49200 | 57.0 |
| 15 | | −13.759 | C | | |
| 16 | Fourth lens group | 19.520 | 1.40 | 1.49200 | 57.0 |
| 17 | | 17.435 | 0.30 | | |
| 18 | | 19.464 | 0.70 | 1.84666 | 23.8 |
| 19 | | 8.215 | 4.05 | 1.69680 | 55.5 |
| 20 | | −25.843 | D | | |
| 21 | Fifth lens group | −19.998 | 1.40 | 1.49200 | 57.0 |
| 22 | | −15.527 | 1.50 | | |
| 23 | Cover glass | ∞ | 4.90 | 1.51633 | 64.1 |
| 24 | | ∞ | | | |

Group distance

| F | A | B | C | D |
|---|---|---|---|---|
| 6.00 | 0.60 | 19.70 | 4.54 | 7.29 |
| 18.27 | 10.62 | 9.68 | 1.87 | 9.97 |
| 57.16 | 17.30 | 3.00 | 8.92 | 2.92 |

Focal length of each lens group

| | |
|---|---|
| First lens group | F(1–5) = 29.903 |
| Second lens group | F(6–11) = −6.756 |
| Third lens group | F(12–15) = 25.184 |
| Fourth lens group | F(16–20) = 21.237 |
| Fifth lens group | F(21–22) = 127.929 |

| Aspherical coefficient | Exponent |
|---|---|
| K = −0.80726 | |
| A1 = 0.68053 × $10^{-4}$ | P1 = 4.0 |
| A2 = −0.4482g × $10^{-5}$ | P2 = 6.0 |
| A3 = 0.29613 × $10^{-6}$ | P3 = 8.0 |
| A4 = −0.59723 × $10^{-8}$ | P4 = 10.0 |
| K = 0.68287 | |
| A1 = −0.59243 × $10^{-4}$ | P1 = 4.0 |
| A2 = 0.96652 × $10^{-6}$ | P2 = 6.0 |
| A3 = −0.20376 × $10^{-7}$ | P3 = 8.0 |
| A4 = 0.22482 × $10^{-9}$ | P4 = 1.0.0 |
| K = −0.26364 × 10 | |
| A1 = 0.56735 × $10^{-4}$ | P1 = 4.0 |
| A2 = 0.77705 × $10^{-6}$ | P2 = 6.0 |
| A3 = −0.64496 × $10^{-7}$ | P3 = 8.0 |
| A4 = −0.87562 × $10^{-9}$ | P4 = 10.0 |

TABLE 6

| | Example 1 | Example 2 | Example 3 | Example 4 | Example 5 |
|---|---|---|---|---|---|
| f3/\|f3a\| | 0.08 | 0.06 | 0.14 | 0.12 | 0.04 |
| V+ | 55.5 | 58.2 | 58.2 | 55.5 | 55.5 |
| V− | 23.8 | 23.8 | 23.8 | 23.8 | 23.8 |
| f4/f+ | 2.17 | 2.05 | 1.94 | 2.27 | 2.26 |
| f4/f− | −1.19 | −1.11 | −0.99 | −1.42 | −1.23 |
| fw/\|f4a\| | 0.002 | — | — | 0.03 | 0.01 |
| fT/f5 | 0.42 | 0.24 | 0.18 | 0.7 | 0.45 |
| Z · fw/\|$f_z$\| | 9.62 | 10.46 | 8.68 | 9.65 | 8.46 |

As each Example and drawing show, the zoom lens realized by the invention is small-sized despite a magnification ratio as high as 10 times or more and is excellent in efficiency as shown in each abberation diagram.

What is claimed is:

1. A zoom lens comprising:

(a) a first lens group having a positive refractive power provided at a fixed position nearest to an object to be photographed;

(b) a second lens group having a negative refractive power provided next to said first lens group, comprising from the object side, a negative meniscus single lens, a convex surface of which faces the object side, a biconcave single lens and a positive single lens in that order, said second lens group being movable along the optical axis in accordance with a change of magnification;

(c) a third lens group having a positive refractive power provided at a fixed position next to said second lens group, comprising of a lens having a weak refractive power including at least one aspherical surface, and a lens having a positive refractive power;

(d) a fourth lens group having a positive refractive power provided next to said third lens group, being movable along the optical axis in accordance with a change of magnification; and (e) a fifth lens group having a weak refractive power provided at a fixed position furthest from an object to be photographed.

2. The zoom lens of claim 1, wherein said fourth lens group comprises a lens having a positive refractive power and a lens having a negative refractive power, the following inequalities being satisfied:

$$45.0 < V+$$

$$V- < 40.0$$

$$1.0 < f4/f+ < 3.0$$

$$-2.5 < f4/f- < -0.5$$

where V+ represents the Abbe's number of the positive lens having the strongest refractive power among said fourth lens group; V− represents the Abbe's number of the negative lens having the strongest refractive power among said fourth lens group; f4 represents the focal length of said fourth lens group; f+ represents the focal length of said positive lens having the strongest refractive power and f− represents the focal length of said negative lens having the strongest refractive power.

3. The zoom lens of claim 1, wherein said fourth lens group comprises a positive lens, a negative lens and a lens having a weak refractive power including at least one aspherical surface.

4. The zoom lens of claim 3, wherein the following inequality is satisfied:

$$f_w/|f4a| < 0.25$$

where $f_w$ represents the focal length of the entire system of said zoom lens at the wide angle end and f4a represents the focal length of said lens having weak refractive power including at least one aspherical surface.

5. The zoom lens of claim 1, wherein the following inequality is satisfied:

$$f3/|f3a| < 0.25$$

where f3 represents the focal length of said third lens group and f3a represents the focal length of said lens having weak refractive power including at least one aspherical surface.

6. The zoom lens of claim 1, wherein the following inequality is satisfied:

$$0 < fT/f5 < 1.5$$

where fT represents the focal length of the entire system of said zoom lens at the telescopic end and f5 represents the focal length of said fifth lens group.

7. The zoom lens of claim 1, wherein said fifth lens group includes at least one aspherical surface.

8. The zoom lens of claim 1, wherein the following inequality is satisfied:

$$6 < Z \cdot f_w / |f_2| < 13$$

where fw represents the focal length of the entire system of said zoom lens at the wide angle end; $f_2$ represents the focal length of said second lens group and Z represents the magnification ratio.

* * * * *

UNITED STATES PATENT AND TRADEMARK OFFICE
CERTIFICATE OF CORRECTION

PATENT NO. : 5,414,562
DATED : May 09, 1995
INVENTOR(S) : Kiichirou UEDA

It is certified that error appears in the above-indentified patent and that said Letters Patent is hereby corrected as shown below:

Claim 1, Column 10, Line 14 delete "of".

Signed and Sealed this

Fifth Day of September, 1995

*Attest:*

BRUCE LEHMAN

*Attesting Officer*          *Commissioner of Patents and Trademarks*